(12) United States Patent
Li

(10) Patent No.: US 10,955,850 B2
(45) Date of Patent: Mar. 23, 2021

(54) WORKING DEVICE ON INCLINED SURFACE AND CLEANING METHOD APPLIED IN SOLAR POWER STATION

(71) Applicant: Zhejiang University, Hangzhou (CN)

(72) Inventor: Xin Li, Hangzhou (CN)

(73) Assignee: Zhejiang University, Hangzhou (CN)

( * ) Notice: Subject to any disclaimer, the term of this patent is extended or adjusted under 35 U.S.C. 154(b) by 70 days.

(21) Appl. No.: 16/107,690

(22) Filed: Aug. 21, 2018

(65) Prior Publication Data

US 2019/0056744 A1 Feb. 21, 2019

(30) Foreign Application Priority Data

Aug. 21, 2017 (CN) .......................... 201710720195.0

(51) Int. Cl.
| | | |
|---|---|---|
| *G05D 1/02* | (2020.01) | |
| *G05D 1/00* | (2006.01) | |
| *H02S 40/10* | (2014.01) | |
| *E04G 23/00* | (2006.01) | |
| *B08B 1/00* | (2006.01) | |

(Continued)

(52) U.S. Cl.
CPC ............. *G05D 1/0219* (2013.01); *B08B 1/00* (2013.01); *E04G 23/002* (2013.01); *G05D 1/0088* (2013.01); *G05D 1/0231* (2013.01); *G05D 1/0287* (2013.01); *H02S 40/10* (2014.12); *B08B 1/002* (2013.01); *B08B 1/04* (2013.01); *B08B 3/04* (2013.01); *G05D 2201/0203* (2013.01)

(58) Field of Classification Search
CPC combination set(s) only.
See application file for complete search history.

(56) References Cited

U.S. PATENT DOCUMENTS

| | | | |
|---|---|---|---|
| 2006/0048800 A1* | 3/2006 | Rast .......................... | A47L 1/02 134/56 R |
| 2014/0005906 A1* | 1/2014 | Pandita ................. | B60W 30/17 701/96 |

(Continued)

FOREIGN PATENT DOCUMENTS

| | | | |
|---|---|---|---|
| JP | S60-259388 A | * | 12/1985 |
| JP | 2012139792 A | * | 7/2012 |

OTHER PUBLICATIONS

JPS60259388—english translation and drawings (Year: 1985).*
JP-2012139792-A—english translation and drawings (Year: 2012).*

*Primary Examiner* — Abby Y Lin
*Assistant Examiner* — Renee LaRose
(74) *Attorney, Agent, or Firm* — McCoy Russell LLP

(57) ABSTRACT

This invention relates to a working device on an inclined surface, consisting of a working robot and a trailer that can run on an inclined surface, as well as a cable connecting the working robot and the trailer. There is a positioning system detects the relative position of the working robot and the trailer. The trailer can recognize the position of the working robot and autonomously move following the working robot. A power supply is installed on the trailer to supply continuous power to the working robot via the cable. The invention also covers a cleaning method for the solar panel array with the above-mentioned working device in a solar power station. The invention is characterized with low investment, easy installation and removal, operator-friendly management and maintenance.

9 Claims, 3 Drawing Sheets

(51) Int. Cl.
*B08B 1/04* (2006.01)
*B08B 3/04* (2006.01)

(56) References Cited

U.S. PATENT DOCUMENTS

2014/0062061 A1* 3/2014 Gettings ................ B60D 1/065
 280/423.1
2017/0157775 A1* 6/2017 Miyake .................... B25J 5/005

* cited by examiner

WORKING DEVICE ON INCLINED SURFACE AND CLEANING METHOD APPLIED IN SOLAR POWER STATION

CROSS REFERENCE TO RELATED APPLICATION

This application claims priority to Chinese Patent Application No. 201710720195.0 entitled "WORKING DEVICE ON INCLINED SURFACE AND CLEANING METHOD APPLIED IN SOLAR POWER STATION," filed on Aug. 21, 2017, the entire contents of which is hereby incorporated by reference in its entirety for all purposes.

SCOPE OF APPLICATION

The invention herein refers to the working robot working on inclined surfaces, which can be applied to the solar power stations, in particular to the inclined surfaces, as well as the cleaning method thereof applied in a solar power station.

BACKGROUND OF THE INVENTION

Some specific work needs to be performed on the inclined surfaces with the obtuse, right angle or acute angle between the inclined surface and the ground level, for example, cleaning the solar panel arrays arranged obliquely. The solar panel is exposed to the air, where the dust falls on the components and blocks the sunlight, which will seriously affect the solar panel conversion efficiency. In addition, the uneven illumination may cause local overheating to generate hot spots, thereby destroying the solar panel. There is a lot of dust in the air. Even soon after cleaning, the solar panels will be covered by dust. Therefore, it is necessary to clean the solar panels frequently.

Currently, the cleaning work of solar power stations is still carried out manually. However, due to the many drawbacks of manual cleaning (for example, high labor costs, low cleaning efficiency, unstable cleaning quality, easy damage to panels, etc.), the robotic cleaning is now gradually replacing the manual cleaning. Taking the existing rail-mounted cleaning robot as an example, the operation process is as follows. First, two or more workers are required to mount the robot on the solar panel arrays. After installation, the robot begins to move laterally along the solar panel arrays, and the cleaning unit on the robot moves up and down along the path, thereby cleaning the solar panel arrays. After cleaning one solar panel array, two or more workers are needed to take the robot down and install it on another solar panel array. The problem with this cleaning method is: This type of rail-mounted cleaning robot is bulky, heavy and complicated to install and remove, which is difficult for one person to carry out and must be done by two or more workers. Moreover, it puts high demand on physical strength and installation experience of workers. Installation and removal take a long time.

Thousands of solar panel arrays in solar power stations are arranged independent of each other. Workers must constantly move the cleaning robot, so they have to repeatedly perform the installation and removal of the robot, which seriously reduces the efficiency of cleaning.

To solve the above problems, the technicians propose a further solution, which is a rail-mounted robot installed on each solar panel array. The robot works in the same way as the robot described above. The difference is that a rail-mounted robot is installed on a solar panel array for a long time and only needs to be installed once, which enables frequent and efficient cleaning and ensures that the solar panels are always clean. It can significantly increase power generation efficiency. However, there remain serious problems: the number of arrays of solar power stations is hundreds of thousands. If one robot is installed on each array, thousands of robots are needed. A large number of robots are distributed in the solar power station covering thousands of acres, which will not only lead to challenging pre-installation work and high investment, but also bring about demanding management and maintenance work.

SUMMARY OF THE INVENTION

The technical problem to be solved by the present invention is to provide a working device and a method thereof on an inclined surface, for example, a cleaning device for a solar power station and a cleaning method thereof, which features low investment, easy installation and removal, operator-friendly management and maintenance.

The invention mentioned herein refers to a working device for the inclined surface, consisting of a working robot and a trailer that runs on an inclined surface, and a cable connecting the working robot and the trailer. The working robot and the trailer are equipped with the positioning system detecting their relative positions, so the trailer can recognize the position of the working robot and follow the working robot autonomously. The trailer is equipped with a power supply to supply continuous power to the working robot via the cable.

Taking the cleaning work of the Solar power station as an example, the invention mentioned herein serves as a cleaning device for the solar power station with solar panel arrays comprising one or more solar panels. The cleaning device of the solar power station comprises a cleaning robot and a trailer for cleaning each solar panel array, as well as a cable between the cleaning robot and the trailer, which share their positions mutually via the positioning system. The trailer is capable of recognizing the position of the cleaning robot and performing autonomous movement following the cleaning robot. The trailer is equipped with a power supply to supply continuous power to the cleaning robot via the cable.

Moreover, an orientation sensor and an edge detection sensor are provided on the cleaning robot to enable autonomous movement on the solar panel array along the predetermined cleaning path; a signal indicator is designed on the cleaning robot, which issues the signal after the cleaning is completed.

Further, a conduit is included in the cable between the cleaning robot and the trailer, and a raw material box is provided on the trailer. The cleaning materials, such as water, cleaning agent, etc, are provided to the cleaning robot.

In addition, the trailer consists of a frame and the detachable parts, including a battery, and/or a controller, and/or a raw material box.

Further, an edge detection device capable of detecting the edge of the inclined surface is provided on the trailer.

Specifically, the inclined surface refers to an inclined surface of the solar panel arrays, and the edge detection device on the trailer is capable of detecting the edge of the solar panel array.

Further, the edge detection device is compose of two object sensing sets.

In addition, each object sensing set consists of two object sensing cells.

Moreover, the camera and the image processing system are mounted on the trailer, of which the camera captures the image of the inclined surface and the edge thereof. The captured image is transmitted to the image processing system in real time for analysis and processing, and the pixel coordinates of the lower edge in the image are used to determine the position and direction of the trailer relative to the lower edge of the inclined surface. The position and direction of the trailer are adjusted accordingly to ensure that the trailer moves generally along the lower edge of the inclined surface.

The invention mentioned herein also provides a cleaning method for the solar power station with one or more solar panel arrays comprising multiple solar panel, of which the inclined surface as described above can be cleaned with the working device mentioned above. The inclined surface refers to the surface of the solar panel array. The operation mentioned herein refers to the cleaning work, and the working robot refers to the cleaning robot. The cleaning work involves the following steps:

Step 1: Transport the cleaning robot and the trailer to the site of the solar power station;

Step 2: Manually place the cleaning robot on a solar panel array to be cleaned, and connect the cleaning robot to the trailer with a cable. Turn on the cleaning robot to automatically clean the solar panel array, which is followed by the trailer automatically;

Step 3: The cleaning robot performs automatic cleaning on the surface of the solar panel array along the predetermined cleaning path, and issues the prompt signal after the cleaning is completed;

Step 4: Manually move the cleaning robot to another solar panel array to be cleaned, and repeat steps 2 and 3.

The invention mentioned herein also provides a cleaning method for the solar power station with one or more solar panel arrays comprising multiple solar panels, of which the inclined surface as described above can be cleaned with the working device mentioned above. The inclined surface refers to the surface of the solar panel array. The operation mentioned herein refers to the cleaning work, and the working robot refers to the cleaning robot. The cleaning work involves the following steps:

Step 1: Transport the cleaning robot and the trailer to the site of the solar power station;

Step 2: Manually place the cleaning robot on a solar panel array to be cleaned, and connect the cleaning robot to the trailer with a cable. Turn on the cleaning robot to automatically clean the solar panel arrays, which is followed by the trailer directed by the edge detection device thereon constantly, so it can adjust the position and direction automatically along the edge of the solar panel array and follow the movement of the cleaning robot;

Step 3: The cleaning robot performs automatic cleaning on the surface of the solar panel array along the predetermined cleaning path, and issues the prompt signal after the cleaning is completed;

Step 4: Manually move the cleaning robot to another solar panel array to be cleaned, and repeat steps 2 and 3.

Compared with the existing technology, the working device for the inclined surface mentioned herein and the cleaning method thereof applied to the solar power station have the following characteristics:

The weight and volume of the cleaning robot and the trailer are very small, which can be carried by one worker. During installation, the worker only needs to place the cleaning robot on the solar panel array and start the cleaning robot and the trailer. After the cleaning is completed, the worker takes the cleaning robot down and places it on another solar panel array. The process of installation, removal and moving puts low requirements of physical and operational skills for workers.

As it is easy to install and remove the cleaning device, a set of cleaning device (cleaning robot+trailer) can be easily used on different solar panel arrays, which eliminates the need to prepare a cleaning device for each solar panel array and significantly reduces the investment.

Although the number of the cleaning device is reduced, since a cleaning device can be easily used on different solar panel arrays, the solar panel arrays can still be cleaned frequently.

The number of cleaning devices is reduced, and for the power station, the initial investment in the cleaning system can be greatly decreased.

As the number of cleaning devices is reduced, the management and maintenance work in the later stage can be greatly lowered. For example, workers can easily recover the cleaning devices for maintenance and daily battery charging.

The trailer has detachable parts, which is convenient for handling and transportation, reducing the labor intensity when handling the trailer. It is beneficial for efficient cleaning of the solar power station.

DETAILED DESCRIPTION OF OPERATION

The invention mentioned herein will be further described in detail below with reference to the attached drawings and examples. It is understood that the specific examples described herein are merely illustrative of the invention and are not limited to the invention.

The invention mentioned herein refers to a working device for working on the inclined surface, consisting of a working robot and a trailer that runs on an inclined surface, and a cable connecting the working robot and the trailer. The working robot and the trailer detect the relative positions via the positioning system, so the trailer can recognize the position of the working robot and follow the working robot autonomously. The trailer is equipped with a power supply to supply continuous power to the working robot via the cable. The working device mentioned herein and its application method will be specifically described below as an example.

Figure 1:
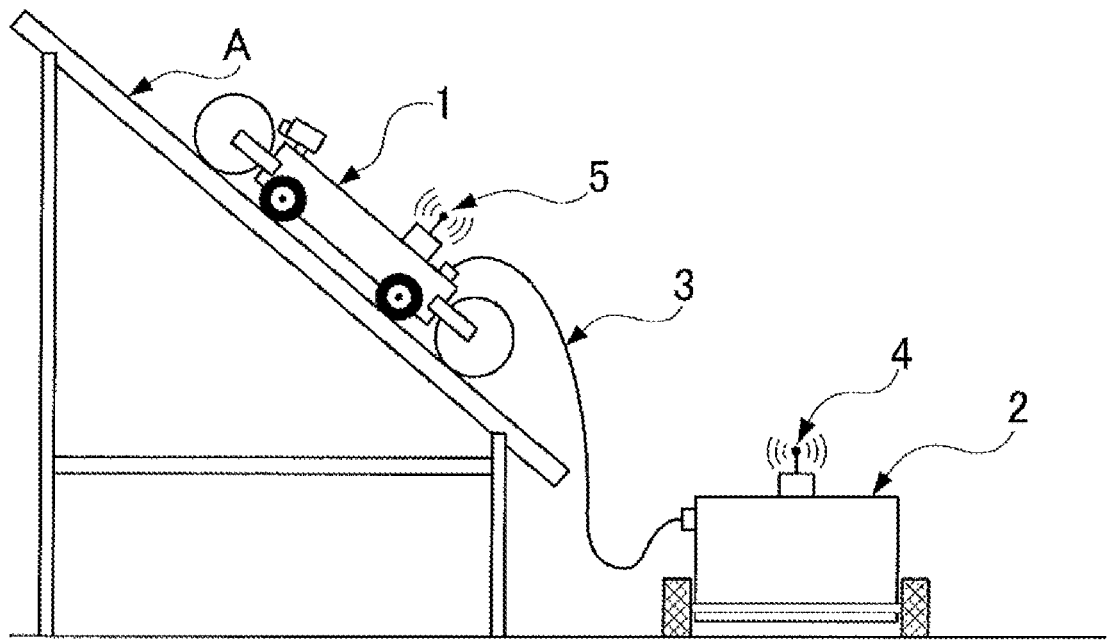
FIG. 1 Side view showing the first example of the working device on the inclined surface.

The example of the invention for cleaning solar power stations is shown in FIG. 1. The solar power station consists of one or more solar panel arrays A, which are composed of one or more solar panels. The surface of the solar panel array A is inclined toward the direction of the sun. The cleaning device of the solar power station consists of a cleaning robot 1 and a trailer 2 that are cleaning each solar panel array, as well as a cable 3 connecting the cleaning robot 1 and the trailer 2.

Figure 3:
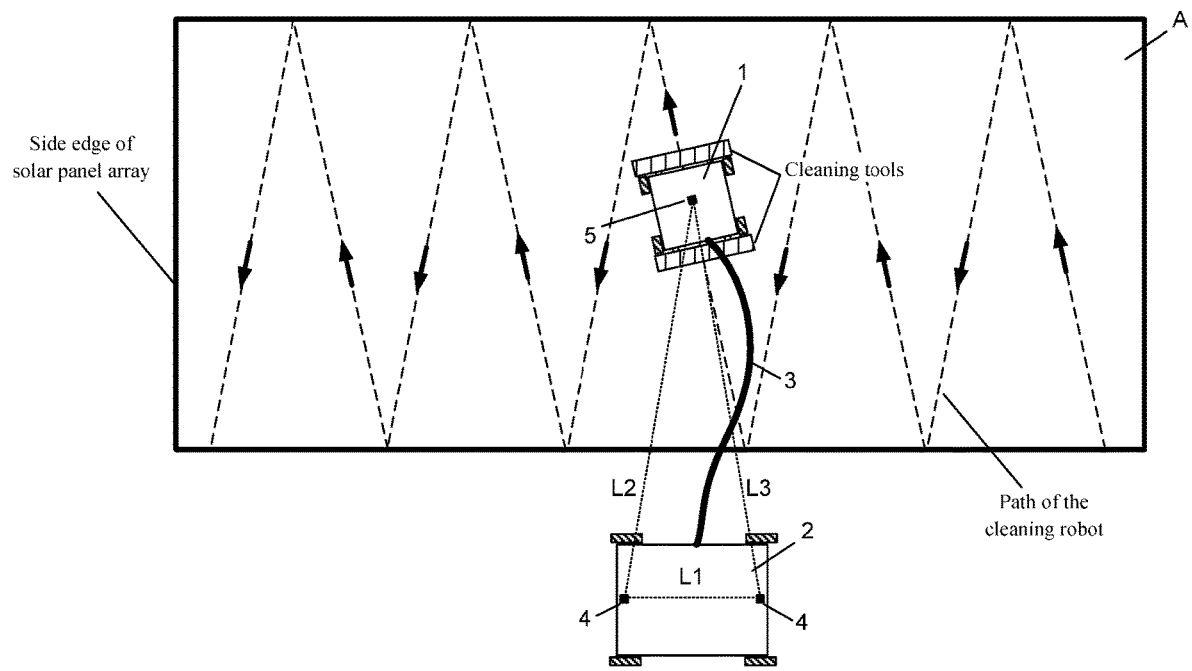
FIG. 3 Top view of FIG. 1.

There is a positioning system detecting mutual position between the cleaning robot 1 and the trailer 2. As shown in FIG. 3, the positioning system is composed of a wireless distance-measuring unit 4. Two wireless distance-measuring units 4 are provided on the trailer 2. A wireless distance-measuring unit 5 is provided on the cleaning robot 1. The wireless distance-measuring units can communicate with each other and detect the distance between each other. Thus, the trailer 2 can recognize the position of the cleaning robot 1 and follow the cleaning robot 1 for autonomous movement. An orientation sensor is mounted on the trailer 2, of which the signal is used to maintain its linear motion. The cleaning tools, such as rotating brushes, are provided on the front and rear sides of the cleaning robot 1 respectively.

The power supply is equipped on the trailer 2, which supplies the continuous power for the cleaning work of the cleaning robot 1 via the cable 3. For example, the trailer 2 is loaded with a large-capacity battery, and the cleaning robot 1 is continuously powered via the cable 3.

An orientation senor and an edge detecting sensor are provided on the cleaning robot 1. With the signal from the orientation senor, the cleaning robot 1 can maintain its direction of motion; with the signal from the edge detecting sensor, the cleaning robot 1 can judge the edge of the solar panel array A.

Therefore, the cleaning robot 1 can autonomously move on the solar panel array A according to a predetermined cleaning path (dashed line in FIG. 3) and ensure that it does not fall off the solar panel array. When the cleaning robot 1 moves to the end of the solar panel array A, the edge detecting sensor of the cleaning robot 1 is triggered by the edge of the solar panel array A multiple times in a short time, and the cleaning is thought to have completed. A signal indicator is provided on the cleaning robot 1 to issue a prompt signal.

As shown in FIG. 3, since two wireless distance-measuring units 4 are mounted on the trailer 2, there is a certain distance between the two wireless distance-measuring units 4, which is indicated as L1. Moreover, one distance-measuring unit 5 is mounted on the cleaning robot 1. The three distance-measuring units can communicate with each other and measure the distance between each other. Then, the two distances measured by the distance-measuring unit of the cleaning robot 1 and the two distance-measuring units of the trailer 2 are denoted as L2 and L3 respectively. A triangle of a known side lengths can be formed between the cleaning robot 1 and the trailer 2. Based on the triangle, the cleaning robot 1 and the trailer 2 can determine their relative position, so that the trailer 2 can follow the cleaning robot 1 autonomously.

A conduit is included in the cable 3 connecting the cleaning robot 1 and the trailer 2. A raw material box is provided on the trailer, and the cleaning materials, such as water are cleaning agent, are supplied to the cleaning robot.

To facilitate handling, the volume and weight of the trailer 2 are designed as small as possible. If the trailer 2 is designed to be small (For example, it is assembled with small wheels, compact body and small power motor), the trailer 2's traveling ability, obstacle performance and driving performance will be affected. Solar power stations are usually built in deserts and farmland, where the ground is uneven and there will be a large number of pits and bulges. Moving on such a ground puts high requirements for the trailer 2 on overcoming obstacles and driving performance. Obviously, the higher the frame of the trailer 2, the larger the wheel, the greater the driving power and the better the traveling ability on the complex ground surface, but the weight and volume of the frame will also become larger, which is not conducive to daily maintenance. For example, a worker needs to recover the trailer 2 and charge it every day. If the trailer 2 becomes bigger and heavier, it will be very difficult for the workers.

Figure 2:
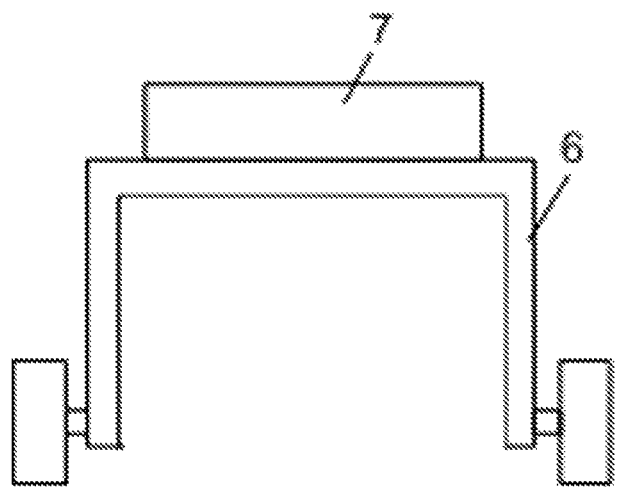
FIG. 2 Front view of the trailer in FIG. 1.

To solve the above problem, the trailer 2 is designed in a split manner as shown in FIG. 2. As another example of the invention, the trailer 2 is composed of a frame 6 and a detachable part 7. The detachable part 7 consists of a battery, and/or a controller, and/or a raw material box. The frame 6 can be designed to be tall, large and heavy according to the road conditions, which is placed in the solar power station for a long time. The detachable part 7 requires scheduled maintenance, special maintenance and protection (For example, the battery pack, the control circuit board and the raw material box). Taking daily battery charging as an example, the worker only needs to take off the detachable part of the battery pack and take it back to the charging center, which greatly reduces the labor intensity of the worker.

In the above example, with the signal of the orientation sensor, the trailer can maintain the direction of linear motion along the solar panel arrays. This method has the following problems, which may cause the trailer to collide with the solar panel arrays.

a. The orientation sensor is unstable and is prone to generating severe errors. For example, the compass sensor based on the magnetic field is highly susceptible to interference from a peripheral magnetic field; the orientation sensor based on acceleration variation is highly prone to cumulative errors.

b. The orientation sensor can ensure that the trailer moves linearly, but it is not suitable for the case where the solar panel arrays are not linearly arranged, for example, a solar panel array arranged in a curved shape.

Therefore, a better solution is proposed in this invention. An edge detection device is mounted on the trailer 2, which can detect the edge of the solar panel array A. It is fixed to the trailer 2 via a sensor holder 8. With the help of the edge detection device, the trailer knows its relative position to the solar panel arrays so that it can move smoothly along the solar panel arrays.

To better understand it working principle, a scheme of an edge detection device will be described in detail herein. The edge detection device consists of two object sensing sets, and each object sensing set are composed of two object sensing cells installed at high and low positions.

Figure 4:
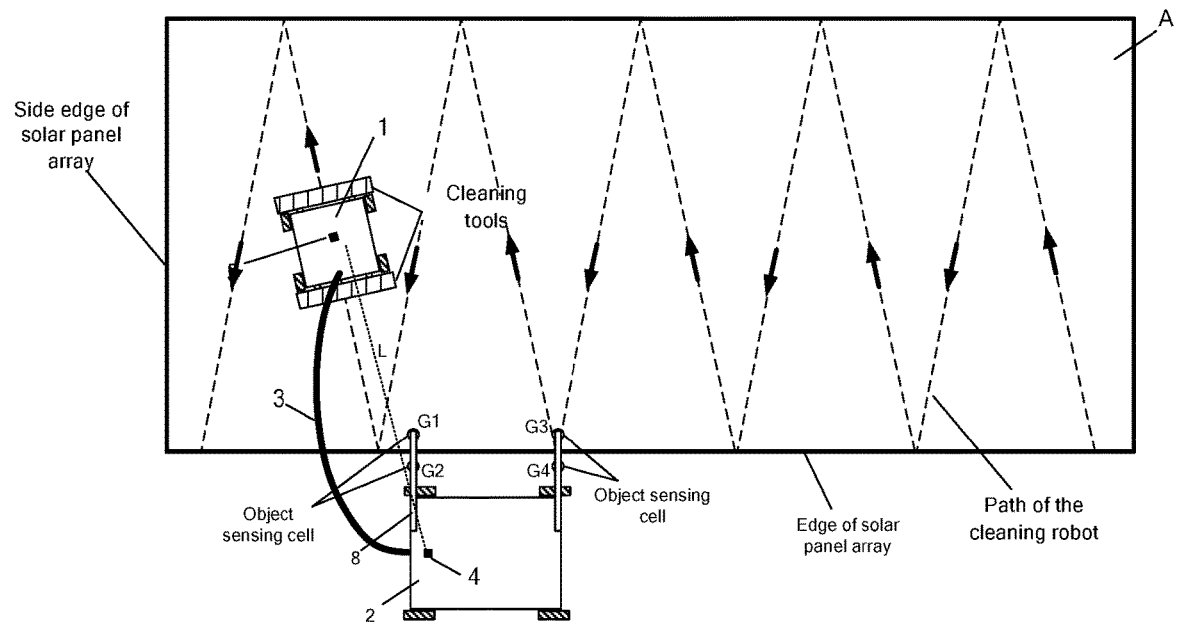
FIG. 4 Top view showing the second example of the working device for the inclined surface.
Figure 5:
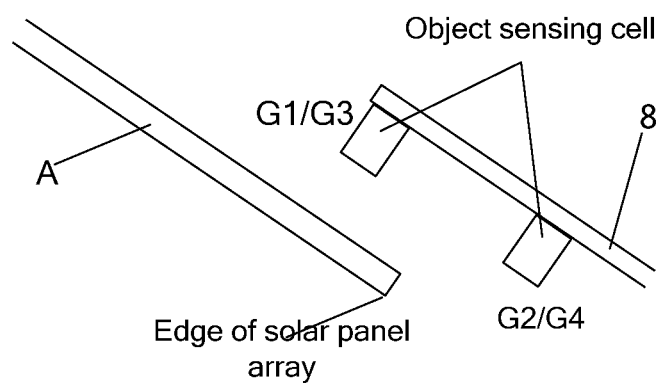
FIG. 5 Enlarged side view of local parts of FIG. 4.

As shown in FIG. 4, the edge detection device consists of four object sensing cells, which are divided into two sets, two in each set, respectively mounted on the sensor holders 8 on both sides of the trailer 2, labeled G1, G2, G3 and G4. The partially enlarged schematic view showing the relative position between the object sensing cells and the edge of the solar panel array A is shown in FIG. 5. When the edge detection device is in operation, the object sensing cell at the higher position is located directly above the inclined surface, which can detect the inclined surface, and the object sensing cell at the lower position is located beyond the inclined surface, which cannot detect the inclined surface. The object sensing cells are respectively located on the upper and lower sides of the edge of the solar panel array A. One object sensing cell can detect the solar panel, and the other object sensing cell cannot detect the solar panel. The relative position between the trailer 2 and the solar panel array A can be known by checking the status of the four object sensing cells. The direction and moving path of the trailer 2 can be adjusted such that it can always move along the solar panel array A, of which edge serves as the reference. For example, when G1 and G3 sense the solar panel, but G2 and G4 do not detect the solar panel, then the trailer 2 maintains a desirable position from the edge of the solar panel array A; when only G1 senses the solar panel, but G3, G2 and G4 do not perceive the solar panel, it indicates that the trailer 2 has been seriously skewed relative to the edge of the solar panel array A. Then, the direction of the trailer 2 shall be adjusted in time to help the trailer 2 to resume the desirable relative position with the edge of the solar panel array A. After the edge detection device is installed on the trailer 2, a closed loop control system is formed; even if there are some external disturbances (For example, the road surface is not flat, the solar panel array is not strictly aligned and the wheels of the trailer have a speed difference in rotation), the trailer 2 can move smoothly along the edge of the solar panel array A. At the same time, the wireless distance-measuring units 4 and 5 are respectively installed on the trailer 2 and the cleaning robot 1, so that the distance L between the two units is measured. The trailer 2 moves accordingly to maintain the distance L, keeping both units at an appropriate distance and ensuring that the cable 3 is not over tensioned. The cleaning tools, such as rotating brushes, are provided on the front and rear sides of the cleaning robot 1 respectively.

Figure 6:
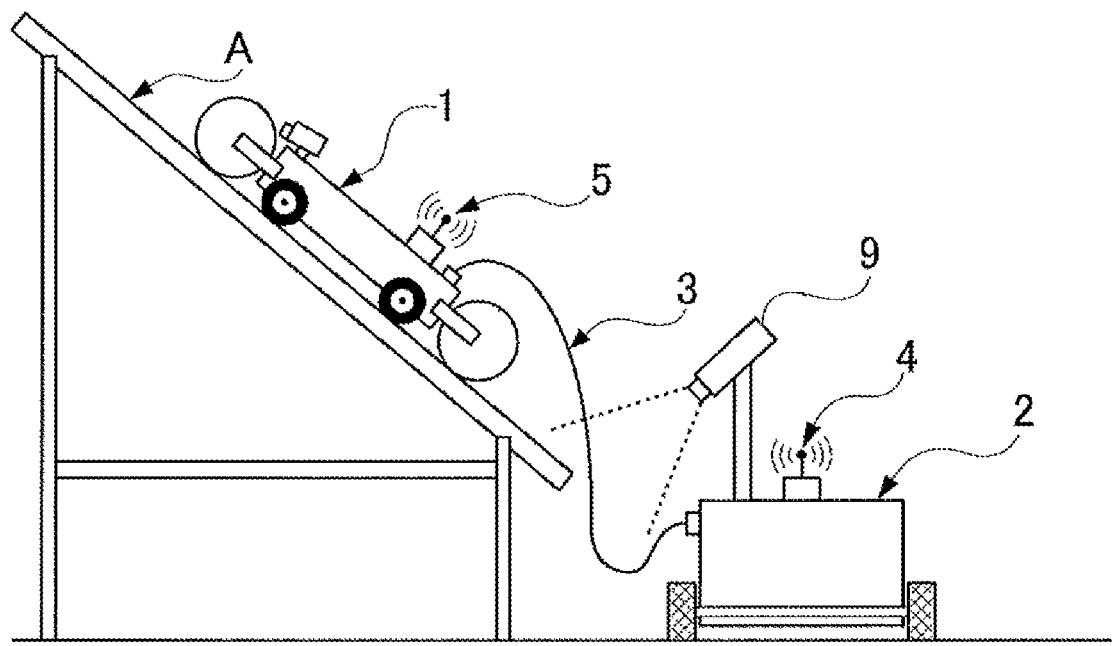
FIG. 6 Side view showing the third example of the working device for the inclined surface.

Referring to the third example, the edge detection device can also be equipped with the image processing technology. As shown in FIG. 6, the camera 9 is mounted on the trailer 2, which can capture an image of the solar panel array A and its edges. The captured image is analyzed by an appropriate image processing system (For example, analyzed against the color of the solar panel array frame or the color change between the solar panel array and the ground) to obtain the pixel coordinates of the lower edge of the solar panel array A. In this way, the position and position of the trailer 2 relative to the lower edge can be adjusted accordingly, to ensure that the trailer 2 moves generally along the edge of the solar panel array A.

The cleaning method of the Solar power station with the cleaning device can be carried out by taking the following steps:

Step 1: Carry the cleaning robot 1, the trailer 2 or the detachable parts of the trailer to the site of the solar power station;

Step 2: Manually place the cleaning robot 1 on a solar panel array A to be cleaned, and connect the cleaning robot 1 to the trailer 2 with the cable 3. Turn on the cleaning robot 1 to automatically clean the solar panel array A. During the cleaning work, the trailer 2 automatically follows the cleaning robot 1 to move;

Step 3: The cleaning robot 1 performs automatic cleaning on the solar panel array A along the predetermined cleaning path, and the signal indicator issues the prompt signal after the cleaning is completed;

Step 4: Manually move the cleaning robot 1 to another solar panel array A to be cleaned, and repeat steps 2 and 3.

With the method mentioned above, one worker can simultaneously manage and operate multiple sets of such cleaning devices. Based on the actual trial operation, one worker can operate and manage 30 to 50 cleaning devices at the same time, who is responsible for placing the cleaning robot 1 and moving the cleaning robot between the solar panel arrays A. Once the cleaning robot 1 is placed, the cleaning robot 1 and the trailer 2 can start cleaning automatically. After cleaning one solar panel array A, the cleaning robot 1 issues a prompt signal to the worker, who can come over to move the cleaning robot 1 to the next solar panel array A, and then continues to clean.

The cleaning method of the solar power station with the cleaning device can be carried out in the following steps:

Step 1: Carry the cleaning robot 1, the trailer 2 or the detachable parts of the trailer to the site of the solar power station;

Step 2: Manually place the cleaning robot 1 on a solar panel array A to be cleaned, and connect the cleaning robot 1 to the trailer 2 with the cable 3. Turn on the cleaning robot to automatically clean the solar panel arrays, which is followed by the trailer 2 directed by the edge detection device thereon constantly, so it can adjust the position and direction automatically along the edge of the solar panel arrays and follow the movement of the cleaning robot 1;

Step 3: The cleaning robot 1 performs automatic cleaning on the solar panel array A along the predetermined cleaning path, and the signal indicator issues the prompt signal after the cleaning is completed;

Step 4: Manually move the cleaning robot 1 to another solar panel array A to be cleaned, and repeat steps 2 and 3.

The examples mentioned above are only the reference for the operation of the invention herein, which are not limited to the invention herein. Any modifications, equivalent substitutions and improvements made within the spirit and principles of the invention shall be covered in the invention patent.

The invention claimed is:

1. A working device designed for working on an inclined surface, comprising:
   a working robot moving and working on the inclined surface, the working robot including a first edge detecting sensor;
   a trailer;
   a second edge detection device on the trailer capable of detecting an edge of the inclined surface;
   a cable connecting the working robot and the trailer, and
   a controller coupled with the trailer and, the working robot and the trailer further equipped with a positioning system detecting relative positions of the working robot and the trailer, the controller of the trailer configured to recognize the position of the working robot and configured to control the trailer to follow the working robot by all of the trailer moving autonomously to follow the working robot, the trailer further equipped with a power supply to provide continuous power to the working robot via the cable.

2. The working device for the inclined surface of claim 1, wherein the working robot further comprises an orientation sensor, so that the working device can move autonomously on the inclined surface according to a predetermined working path, and a signal indicator provided on the working robot which issues a prompt signal after an operation is completed.

3. The working device for the inclined surface of claim 1, further comprising a conduit in the cable between the working robot and the trailer, and a raw material box equipped on the trailer which provides raw materials required for operation of the working robot.

4. The working device for the inclined surface of claim 3, wherein the trailer is composed of a frame and a detachable part.

5. The working device for the inclined surface of claim 1, wherein the inclined surface is made of solar panel arrays, and wherein the second edge detection device on the trailer is capable of detecting an edge of the solar panel array.

6. The working device for the inclined surface of claim 5, wherein the second edge detection device has two object sensing sets.

7. The working device for the inclined surface of claim 6, wherein two object sensing cells in each object sensing set are provided.

8. The working device for the inclined surface of claim 5, wherein a camera and an image processing system are mounted on the trailer, the camera configured to capture an image of the inclined surface and a lower edge thereof, wherein the captured image is transmitted to the image processing system for analysis and processing in real time, and wherein pixel coordinates of the lower edge of the inclined surface in the image are obtained by which a position and direction of the trailer relative to the lower edge of the inclined surface can be identified, the position and direction of the trailer adjusted accordingly to ensure that the trailer moves roughly along the lower edge of the inclined surface.

9. A cleaning method for a solar power station comprising one or more solar panel arrays, each of the one or more solar panel arrays composed of one or more solar panels, an inclined surface cleaned with the working device of claim 6, wherein the inclined surface refers to a surface of the one or more solar panel arrays, wherein operation mentioned herein refers to cleaning work, and wherein the working robot refers to a cleaning robot, the cleaning work involving the following steps:

step 1: carry the cleaning robot and the trailer to a site of the solar power station;

step 2: manually place the cleaning robot on a solar panel array to be cleaned, and connect the cleaning robot to the trailer with the cable; turn on the cleaning robot to automatically clean the solar panel array, wherein the cleaning robot is followed by the trailer directed by the edge detection device thereon constantly, so the trailer can adjust position and direction automatically along an edge of the solar panel array and follow a movement of the cleaning robot, the trailer obtaining pixel coordinates of a lower edge of the solar panel array, wherein a position of the trailer relative to the lower edge is adjusted based thereon;

step 3: the cleaning robot performs automatic cleaning on the surface of the solar panel array along a predetermined cleaning track, and issues a prompt signal after the cleaning work is completed; and step 4: manually move the cleaning robot to another solar panel array to be cleaned, and repeat steps 2 and 3.

\* \* \* \* \*